(12) United States Patent
Ono et al.

(10) Patent No.: US 9,542,053 B2
(45) Date of Patent: Jan. 10, 2017

(54) TOUCH SCREEN, TOUCH PANEL, DISPLAY, AND ELECTRONIC APPARATUS

(71) Applicant: Mitsubishi Electric Corporation, Tokyo (JP)

(72) Inventors: Takeshi Ono, Tokyo (JP); Tatsuya Nakamura, Tokyo (JP); Takuji Imamura, Tokyo (JP); Takashi Miyayama, Tokyo (JP); Tae Orita, Tokyo (JP); Masafumi Agari, Tokyo (JP); Naoki Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 26 days.

(21) Appl. No.: 14/603,814

(22) Filed: Jan. 23, 2015

(65) Prior Publication Data

US 2015/0227237 A1    Aug. 13, 2015

(30) Foreign Application Priority Data

Feb. 12, 2014    (JP) .................................. 2014-024188

(51) Int. Cl.
*G06F 3/044* (2006.01)

(52) U.S. Cl.
CPC ..... *G06F 3/044* (2013.01); *G06F 2203/04112* (2013.01)

(58) Field of Classification Search
CPC ........................ G06F 3/044; G06F 2203/04112
See application file for complete search history.

(56) References Cited

U.S. PATENT DOCUMENTS

| 5,844,506 | A | 12/1998 | Binstead |
| 6,137,427 | A | 10/2000 | Binstead |
| 6,452,514 | B1 | 9/2002 | Philipp |
| RE40,867 | E | 8/2009 | Binstead |
| 8,269,744 | B2 | 9/2012 | Agari et al. |
| 8,390,598 | B2 | 3/2013 | Agari et al. |
| 2010/0309162 | A1* | 12/2010 | Nakanishi ............... G06F 3/044 345/174 |
| 2011/0310037 | A1* | 12/2011 | Moran .................. G06F 3/0412 345/173 |
| 2013/0082964 | A1 | 4/2013 | Agari et al. |

(Continued)

FOREIGN PATENT DOCUMENTS

| JP | H09-511086 A | 11/1997 |
| JP | 2003-526831 A | 9/2003 |

(Continued)

*Primary Examiner* — Liliana Cerullo
(74) *Attorney, Agent, or Firm* — Studebaker & Brackett PC

(57) ABSTRACT

A touch screen according to the present invention includes a transparent substrate, a first detection electrode formed on the transparent substrate, a second detection electrode disposed to sterically cross the first detection electrode via an interlayer insulating film, and a polarizing plate bonded to cover the second detection electrode. Each of the first detection electrode and the second detection electrode includes, as a repetition unit, thin wire electrodes that incline in different directions and cross each other. The thin wire electrodes are formed of a combination of a plurality of conductive thin wires extending in a direction inclined 10 degrees or less from a transmission axis direction or an absorption axis direction of the polarizing plate.

7 Claims, 10 Drawing Sheets

(56) References Cited

U.S. PATENT DOCUMENTS

2013/0242485 A1 9/2013 Ohtani et al.
2015/0002464 A1 1/2015 Nishioka et al.

FOREIGN PATENT DOCUMENTS

| JP | 2010-097536 A | 4/2010 |
| JP | 2012-103761 A | 5/2012 |
| JP | 2013-080328 A | 5/2013 |
| WO | 95/27334 A1 | 10/1995 |
| WO | 00/44018 A1 | 7/2000 |
| WO | 2013/133026 A1 | 9/2013 |

* cited by examiner

F I G. 3
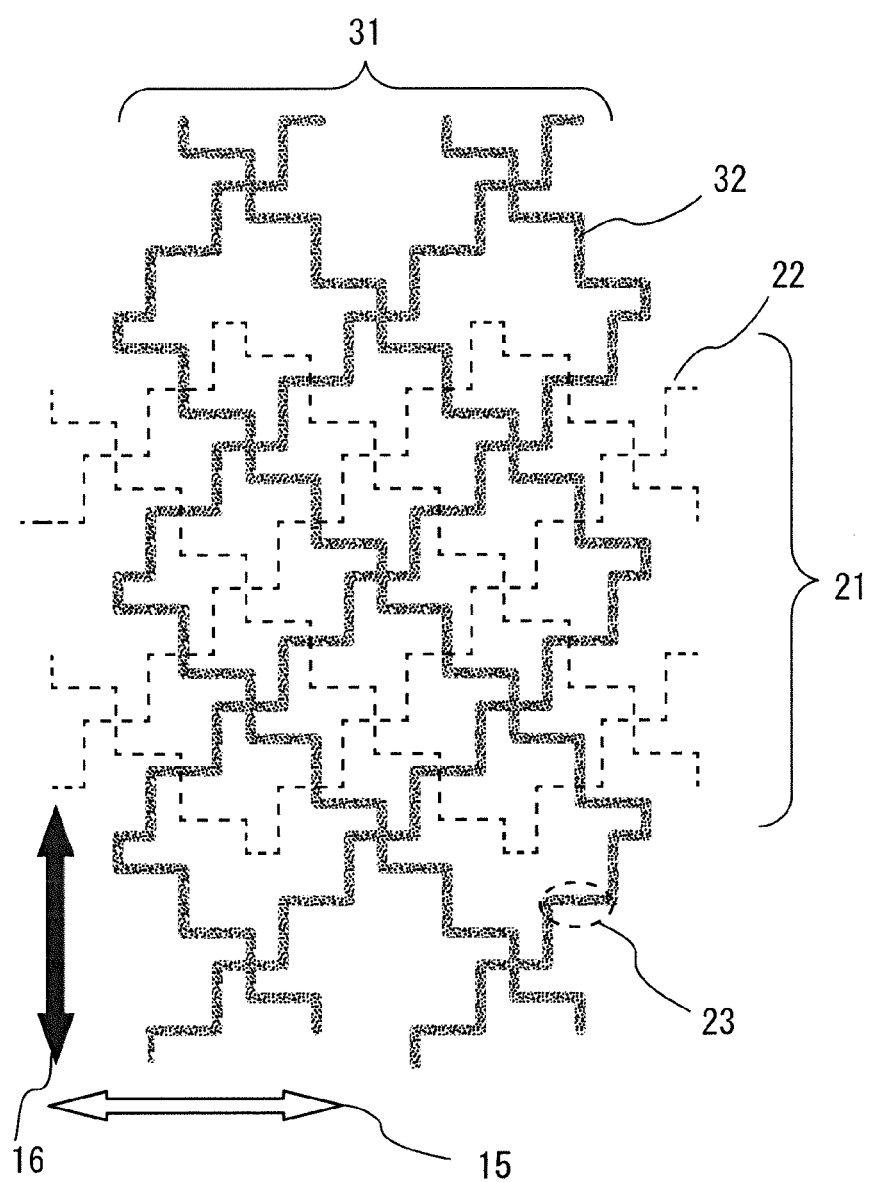

F I G. 4
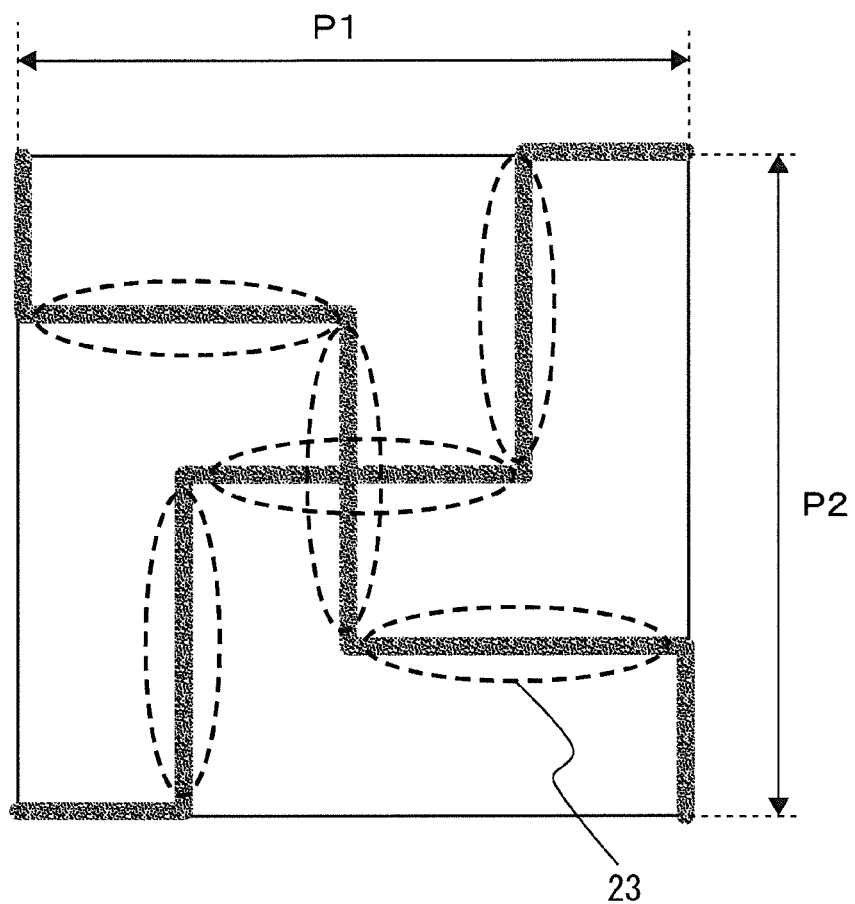

F I G. 1 1
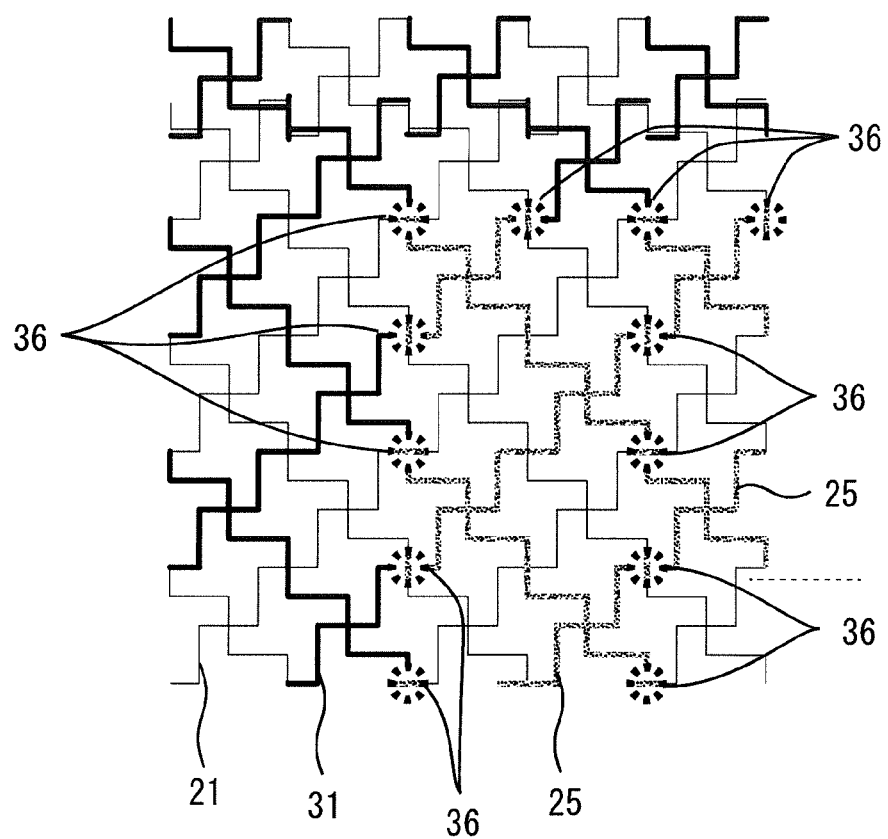

TOUCH SCREEN, TOUCH PANEL, DISPLAY, AND ELECTRONIC APPARATUS

BACKGROUND OF THE INVENTION

Field of the Invention

The present invention relates to a touch screen, a touch panel including the touch screen, a display, and an electronic apparatus.

Description of the Background Art

Touch panels, which detect the touch by a pointer, such as a finger, and identify the touched position coordinates, have received attention as one of the excellent input means. In general, a touch panel includes a touch screen with a touch sensor embedded therein and a detector that identifies the touched position coordinates on the basis of a signal from the touch screen. The touch panels employing various detection methods including the resistive film method and the capacitive method have been introduced commercially.

One type of the touch panel employing the capacitive method is the projected capacitive touch panel (see, for example, Japanese Patent Application Laid-Open No. 2012-103761). The projected capacitive touch panel is capable of detecting the touch if the front surface of the touch screen with the touch sensor embedded therein is covered by the protective plate, such as a glass plate having the thickness of several millimeters. Therefore, such projected capacitive touch panel has the excellent ruggedness. The projected capacitive touch panel is also capable of detecting the touched position via the glove and includes no moving parts, thus having a long life.

The projected capacitive touch panel includes, as the detection electrodes to detect the capacitance, the first detection electrodes formed on the thin dielectric film in the row direction and the second detection electrodes formed over the first detection electrodes via the interlayer insulating film in the column direction. The detection electrodes do not have an electrical contact therebetween and include a plurality of intersection points formed via the dielectric film.

The projected capacitive touch panels can be classified into the touch panels employing the self-capacitance detection method and the touch panels employing the mutual capacitance detection method (see, for example, Japanese Unexamined Patent Application Publication (Translation of PCT Application) No. 09-511086 (1997) and Japanese Unexamined Patent Application Publication (Translation of PCT Application) No. 2003-526831). According to the self-capacitance method, the capacitance between the pointer, such as a finger, and the respective detection electrodes is detected to calculate the touched position coordinates. According to the mutual capacitance detection method, the position coordinates are calculated from the change in the capacitance between the detection electrodes caused by the pointer.

When the pointer, such as a finger, touches the planar region (detection cell) divided into a grid pattern by the first detection electrodes formed in the row direction and the second detection electrodes formed in the column direction, the touched position coordinates are identified from the proportion between the detected value in the detection cell and the detected value in the adjacent detection cell according to the self-capacitance detection method and the mutual capacitance detection method described above. The reduction in the interconnect resistance of the detection electrodes can increase the sensitivity of the touch screen. Thus, the detection electrodes each formed of the thin wire electrodes made of, for example, a metal having a low interconnect resistance substitute for the traditional detection electrodes formed of the thin-film transparent electrodes.

Assume that the first and second detection electrodes are formed of the metal thin-wire electrodes linearly extending in the row direction and in the column direction, respectively. In this case, the alignment direction of the pixels included in the liquid crystal display equipped with the touch screen becomes identical to the direction of the metal thin-wire electrodes included in the detection electrodes. If the pixel alignment and the repetition pitch of the thin wire electrodes have a certain relationship, the optical interference causes moire (interference fringes), considerably deteriorating the display quality. In a case where the detection electrodes include only the metal thin-wire electrodes extending in parallel in a single direction, the detectable area for the touch is unfortunately narrowed due to the occurrence of wire breakage.

Thus, the first and second detection electrodes extending in the row direction or in the column direction are formed of the thin wire electrodes having a mesh pattern in which the metal thin-wire electrodes obliquely inclined in different directions cross each other. Such detection electrodes including the thin wire electrodes having a mesh pattern extend in the direction that agrees with the pixel alignment direction. Meanwhile, the direction of the thin wire electrodes differs from the direction of the pixel alignment because the detection electrodes include the metal thin-wire electrodes inclined in the oblique direction. In addition, the repetition pitch can be adjusted. Therefore, the occurrence of moire can be prevented. Moreover, the thin wires are interconnected in a mesh pattern. Thus, the detection region is not narrowed when the wires are partly broken (see, for example, Japanese Patent Application Laid-Open No. 2010-97536).

However, the following problem arises when the lower layer of the polarizing plate on the front surface includes the touch screen in which the first and second detection electrodes extending in the row direction and the column direction are formed of the thin wire electrodes having a mesh pattern in which the metal thin-wire electrodes obliquely inclined in different directions cross each other. When the polarized light that is in parallel with or is perpendicular to the screen, in other words, the polarized light in the column direction or in the row direction enters the touch screen from the back surface, the polarization state of the incident light is changed by the thin wire electrodes having a mesh pattern and extending in the oblique direction. This allows the light that is to be absorbed in the polarizing plate on the front surface to penetrate the polarizing plate, unfortunately resulting in a light leakage.

SUMMARY OF THE INVENTION

The present invention has an object to provide a liquid crystal panel and a display having an excellent display quality free from, for example, a light leakage during the black display.

A touch screen according to the present invention includes a transparent substrate, a first detection electrode formed on the transparent substrate, a second detection electrode disposed to sterically cross the first detection electrode via an interlayer insulating film, and a polarizing plate bonded to cover the second detection electrode. Each of the first detection electrode and the second detection electrode includes, as a repetition unit, thin wire electrodes that incline in different directions and cross each other. The thin wire electrodes are formed of a combination of a plurality of conductive thin wires extending in a direction inclined 10 degrees or less from a transmission axis direction or an absorption axis direction of the polarizing plate.

In the touch screen described above, the conductive thin wires extending in the direction inclined 10 degrees or less from the transmission axis direction or the absorption axis direction of the polarizing plate are combined and the first detection electrode and the second detection electrode include, as a repetition unit, the thin wire electrodes that incline in different directions and cross each other. This configuration prevents the occurrence of moire and the change in the polarization state of light incident on the touch screen at the same time, thereby providing the excellent displaying free from a light leakage.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an enlarged schematic view of an intersection of detection electrodes of the touch screen according to the first preferred embodiment;

FIG. 4 is an enlarged view of unit thin-wire electrodes of the touch screen according to the first preferred embodiment;

FIG. 11 is a plan view of dummy wirings of the touch screen according to the fourth preferred embodiment.

DESCRIPTION OF THE PREFERRED EMBODIMENTS

Figure 1:
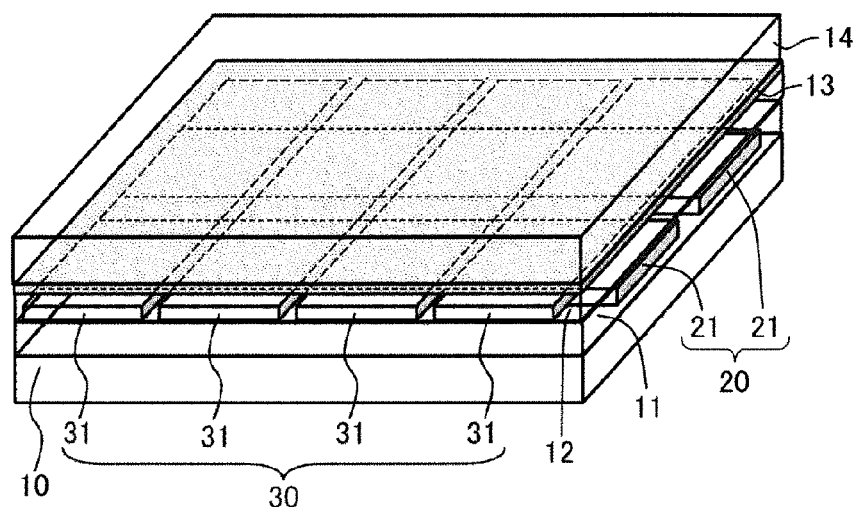
FIG. 1 is a perspective view of a touch screen according to a first preferred embodiment.

The same reference signs indicate the same or corresponding parts in the description of the preferred embodiments and in the drawings. In the preferred embodiments, a touch screen refers to a position sensor that outputs a signal corresponding to the contact position in response to the contact with a pointer, such as a finger. A touch panel refers to an input device that mainly includes a touch screen and a detector that identifies the position coordinates on the basis of an output signal from the touch screen.

In the description of the preferred embodiments, the two layered electrodes formed via the interlayer insulating film in the touch screen are referred to as an upper electrode and a lower electrode, respectively. The electrode that is included in the upper electrode and the lower electrode and detects, for example, changes in capacitance caused by the pointer are referred to as a detection electrode. The detection electrode is formed of the electrodes having a mesh pattern in which the electrodes made of a conductive material in the form of thin wires with finite lengths are interconnected. The electrodes having a mesh pattern are referred to as thin wire electrodes and the thin wires that are made of the conductive material and form the thin wire electrodes are referred to as conductive thin wires.

First Preferred Embodiment

<Configuration of Touch Screen>

Figure 2:
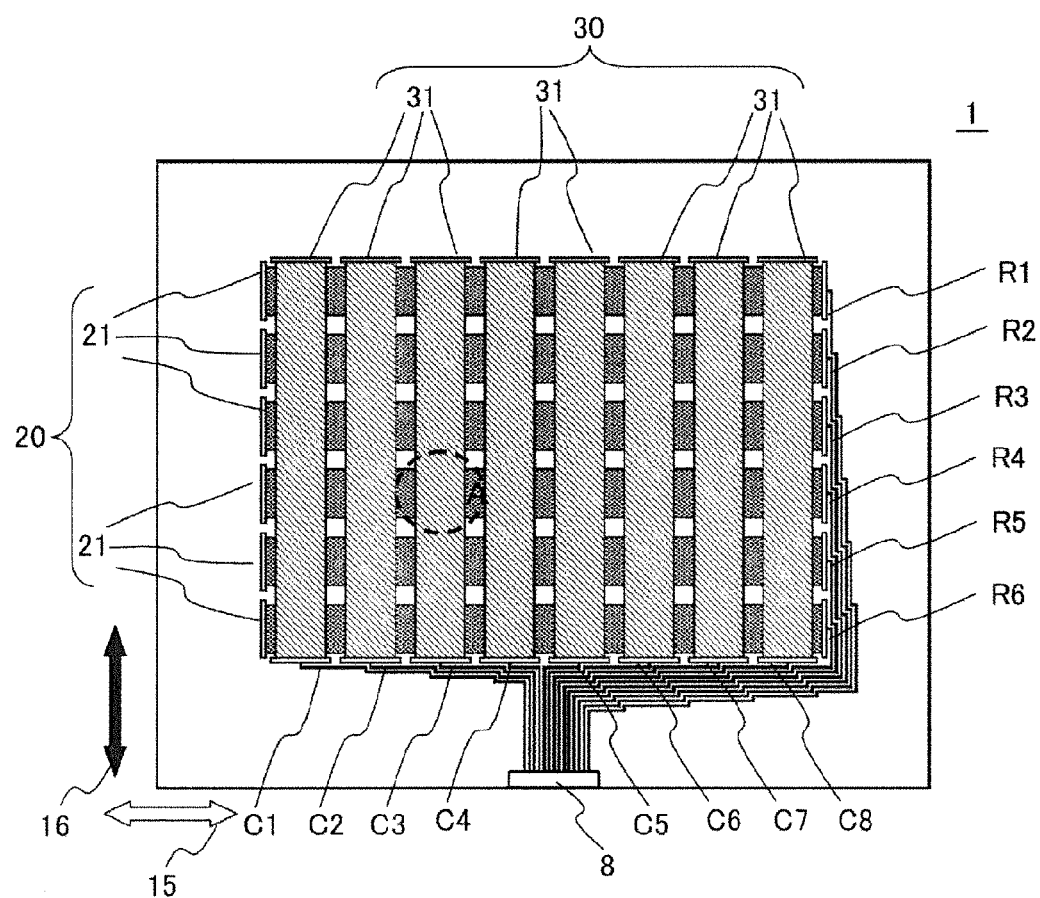
FIG. 2 is a plan view of the touch screen according to the first preferred embodiment.

With reference to FIGS. 1 and 2, the following describes an outline of the structure of a touch screen 1 according to this preferred embodiment. The touch screen 1 according to this preferred embodiment is a projected capacitive touch screen. FIG. 1 is a perspective view of the laminated structure of the touch screen 1 according to a first preferred embodiment for providing the present invention and illustrates a part that is cut out from the touch screen 1. FIG. 2 is a plan view of the touch screen 1 according to this preferred embodiment and illustrates not only the part of the touch screen 1 touched by a pointer, such as a finger, but also the lead-out wiring part on the periphery.

As shown in FIG. 1, in the touch screen 1 according to this preferred embodiment, a lower electrode 20 including a plurality of first detection electrodes 21 is formed on a transparent substrate 10. An interlayer insulating film 11 is formed to cover the lower electrode 20. An upper electrode 30 including a plurality of second detection electrodes 31 is formed on the upper surface of the interlayer insulating film 11. A protective film 12 is formed on the upper surface of the interlayer insulating film 11 so as to cover the upper electrode 30.

As shown in FIG. 2, the second detection electrodes 31 included in the upper electrode 30 and the first detection electrodes 21 included in the lower electrode 20 are formed to be orthogonal to each other in plan view. The interlayer insulating film 11 is formed over the entire surfaces of the first detection electrodes 21 and the second detection electrodes 31 are formed on the upper surface of the interlayer insulating film 11 in this preferred embodiment. Alternatively, the interlayer insulating film 11 between the first detection electrodes 21 and the second detection electrodes 31 may be formed exclusively at the intersections of the electrodes to electrically disconnect the electrodes from each other.

The first detection electrodes 21 included in the lower electrode 20 extends in the horizontal direction (row direction) in FIG. 1 and the second detection electrodes 31 included in the upper electrode 30 extend in the depth direction of the paper (column direction) in FIG. 1 in this preferred embodiment. The alignment should allow the first and second detection electrodes 21 and 31 extending in the respective directions to cross each other in plan view. Naturally, the first detection electrodes 21 may extend in the depth direction of the paper (column direction) and the second detection electrodes 31 may extend in the horizontal direction (row direction) in FIG. 1. Note that the first and second detection electrodes 21 and 31 are formed of the thin-wire electrodes having a mesh pattern in which the conductive thin wires made of the conductive material in the form of thin wires are connected. This structure characterizes the present invention and will be described later.

The interlayer insulating film 11 and the protective film 12 may be formed of an insulating film made of a transparent inorganic material, such as a silicon nitride film or a silicon oxide film, or may be formed of an insulating film made of an organic material, such as an epoxy resin or an acrylic resin. Both the interlayer insulating film 11 and the protective film 12 in this preferred embodiment have been formed of the silicon nitride film. The transparent substrate 10 may be formed of a transparent glass substrate or a transparent resin substrate. The transparent substrate 10 in this preferred embodiment has been formed of the glass substrate.

A polarizing plate 13 for the liquid crystal panel is bonded to the upper surface of the protective film 12. A surface substrate 14 that is transparent adheres to the upper surface of the polarizing plate 13 to protect the touch screen 1. As shown in FIG. 2, the polarizing plate 13 is bonded such that a transmission axis direction 15 agrees with the horizontal direction (row direction) and an absorption axis direction 16 agrees with the longitudinal direction (column direction). The surface substrate 14 may be formed of the transparent glass substrate or the transparent resin substrate as with the transparent substrate 10 serving as the bottom layer of the touch screen 1. The surface substrate 14 in this preferred embodiment has been formed of the resin substrate made of an acrylic resin.

<Peripheral Structure of Touch Screen>

When the pointer, such as a finger, touches the surface substrate 14 disposed on the surface of the touch screen 1, the capacitive coupling (touch capacitance) is generated between the pointer and the first detection electrodes 21 below the surface substrate 14 and between the pointer and the second detection electrodes 31 below the surface substrate 14. According to the self-capacitance method, the touch capacitance is detected, so that the touched position in the detectable area is identified.

FIG. 2 illustrates not only the part of the touch screen 1 touched by the pointer, such as a finger, as described above but also the lead-out wiring part on the periphery. The detectable area of the touch screen 1 is the matrix region formed of the plurality of first detection electrodes 21 extending in the horizontal direction and the plurality of second detection electrodes 31 extending in the longitudinal direction.

The first detection electrodes 21 extending in the horizontal direction (row direction) are respectively connected to lead-out traces R1 to R6. The second detection electrodes 31 extending in the longitudinal direction (column direction) are respectively connected to lead-out traces C1 to C8. The lead-out traces R1 to R6 and the lead-out traces C1 to C8 are routed along the outer periphery of the detectable area of the touch screen 1 to be connected to a terminal 8 for forming the connection with the external wiring. The lead-out traces are preferably aligned close together along the outer periphery of the detectable area of the touch screen 1. This close alignment reduces the fringe capacitance between the lead-out traces and the display with the touch screen 1 bonded thereto, thereby weakening the influence of electromagnetic noise on the output signals of the touch screen 1 caused by the display.

<Structure of Detection Electrodes>

FIG. 3 is an enlarged view of the intersections of the detection electrodes of the touch screen according to the first preferred embodiment, providing an enlarged illustration of the part enclosed in a broken-line circle (A) shown in FIG. 2. In FIG. 3, the broken lines indicate the first detection electrode 21 included in the lower electrode 20 and the solid lines indicate the second detection electrode 31 included in the upper electrode 30. The first detection electrode 21 and the second detection electrode 31 are formed of the first thin-wire electrodes 22 having a mesh pattern and the second thin-wire electrodes 32 having a mesh pattern, respectively. The first detection electrode 21 and the second detection electrode 31 may be formed of a plurality of thin-wire electrodes 22 and a plurality of thin-wire electrodes 32, respectively. The thin-wire electrode 22 and 32 are respectively made of a metallic material, such as aluminum. The first and second thin-wire electrodes 22 and 32 in this preferred embodiment have been formed of metal thin wires made of aluminum.

In FIG. 3, the first detection electrode 21 extends in the horizontal direction (row direction) and the second detection electrode 31 extends in the longitudinal direction (column direction) as with those in, for example, FIG. 2. The detection electrode 21 and the detection electrode 31 are aligned to be orthogonal to each other.

Although the first thin-wire electrodes 22 having a mesh pattern and the second thin-wire electrodes 32 having a mesh pattern are disposed such that the respective mesh patterns deviate by a half pitch from each other in plan view in FIG. 3, the configuration is not limited thereto. Alternatively, the deviation may be increased, or decreased, or the overlapping configuration with no deviation from each other may be allowed.

The polarizing plate 13 for liquid crystal displaying is formed to cover the touch screen 1. The polarizing plate 13 is bonded such that the transmission axis direction 15 agrees with the extending direction of the first detection electrodes 21 as indicated by the white arrow and the absorption axis direction 16 that is orthogonal to the transmission axis direction agrees with the extending direction of the second detection electrodes 31 as indicated by the black arrow.

In this case, the polarizing plate disposed on the back surface of the liquid crystal panel has the transmission axis in the direction indicated by the black arrow shown in FIG. 2 and the absorption axis in the direction indicated by the white arrow shown in FIG. 2. The optical property and the like in the example of the specific liquid crystal display mode will be described later in detail. In a case where the detection electrodes 21 and 31 are included, the polarizing plate on the front surface and the polarizing plate on the back surface may be respectively turned by 90 degrees such that the direction of the absorption axes and the direction of the transmission axes of the respective polarizing plates are reversed.

The first thin-wire electrode 22 included in the first detection electrode 21 and the second thin-wire electrode 32 included in the second detection electrode 31 shown in FIG. 3 have the same shape and are formed of a repetitive pattern of a plurality of conductive thin wires 23 (as an example, one of the conductive thin wires 23 is enclosed in the broken-line ellipse) having a linear shape with the ends thereof connected to each other.

FIG. 4 shows an enlarged view of the repetition unit (unit thin-wire electrode) of the thin-wire electrode formed of the conductive thin wires 23 having a linear shape. The first and second detection electrodes 21 and 31 principally include the identical unit thin-wire electrodes repeatedly formed. As shown in FIG. 4, the first and second detection electrodes 21 and 31 include the repeatedly formed units of P1 and P2 in which the unit thin-wire electrodes are composed of a combination of the conductive thin wires 23 (each of the conductive thin wires 23 is enclosed in the broken-line ellipse) having a linear shape and extending in the vertical direction and in the lateral direction of the paper.

In particular, the first detection electrode 21 and the second detection electrode 31 are formed of the thin-wire electrode 22 and the thin-wire electrode 32, respectively. The two thin-wire electrodes 22 and 32 are inclined in different directions and respectively extend in the oblique directions in a stepwise pattern. The thin-wire electrode 22 and the thin-wire electrode 32 cross each other around the central part. The thin-wire electrode 22 and the thin-wire electrode 32 have the structure in which the plurality of conductive thin wires 23 having a linear shape and extending in the transmission axis direction or the absorption axis direction of the polarizing plate are interconnected. Each of the detection electrodes 21 and 31, which are the important components of the present invention, includes such structures repeatedly formed therein.

<Influence on Optical Property>

In this preferred embodiment, the display including the touch screen 1 is not limited to a particular mode. To describe the relation between the optical property and the direction of the conductive thin wires 23 formed in the touch screen, the following describes, as an example of such display, the liquid crystal display in the twisted nematic (TN) mode, which is the most common liquid crystal display mode.

The polarizing plates for the liquid crystal display are disposed on the back-surface side and the front-surface side of the liquid crystal layer (in the configuration shown in FIG. 1, the polarizing plate 13 is disposed between the protective film 12 and the transparent substrate 14 serving as the top layer). In a case where the transmission axis of the polarizing plate on the front-surface side is set in the extending direction of the first detection electrode 21 (the direction of the white arrow 15 shown in FIGS. 2 and 3), the transmission axis of the polarizing plate on the back-surface side should be set in the extending direction (the direction of the black arrow 16 shown in FIGS. 2 and 3) of the second detection electrode 31 orthogonal to the transmission axis of the polarizing plate on the front-surface side such that the black display is provided through application of voltage. The first and second detection electrodes 21 and 31 include the conductive thin wires 23 formed in the extending direction thereof or in the direction orthogonal thereto. Thus, the conductive thin wires 23 extend in the transmission axis direction 15 or the absorption axis direction 16 of the polarizing plate on the front-surface side.

The liquid crystal display mode is not limited to the TN mode. Alternatively, the transverse electric field mode may be employed. The transmission axis direction of the polarizing plate on the front-surface side may take on various values depending on, for example, the liquid crystal display mode to be employed and the positional relationship between the liquid crystal display and the touch screen 1. The directions of the conductive thin wires 23 formed on the touch screen 1 should be inclined 10 degrees or less from the transmission axis direction or the absorption axis direction of the polarizing plate.

During the black display, the light emitted from the backlight penetrates the polarizing plate on the back-surface side and the liquid crystal layer. Upon reaching the polarizing plate on the front-surface side, the light is polarized to be orthogonal to the transmission axis direction of the polarizing plate on the front-surface side, thereby failing to penetrate the polarizing plate on the front-surface side. Thus, the black display is provided.

Assume that the directions of the conductive thin wires 23 formed on the touch screen 1 are inclined over 10 degrees from the transmission axis direction or the absorption axis of the polarizing plate. When the light that has passed through the liquid crystal layer penetrates the touch screen 1, the polarization state including the polarization direction is changed due to the effects of the conductive thin wires 23. Consequently, the optical components that are allowed to penetrate the polarizing plate increase, being visually recognized as a light leakage. Thus, the display quality is degraded.

In this preferred embodiment, the thin-wire electrodes 22 and 23 include, as the repetition unit shown in FIG. 4, a combination of the conductive thin wires 23 disposed in the transmission axis direction or in the absorption axis direction of the polarizing plate. The detection electrodes 21 and 31 include, as the repetition unit, the thin-wire electrodes 22 and 32 shown in FIG. 3. Thus, the polarizing state is not changed by the thin-wire electrode 22, thereby providing the excellent displaying free from light leakage.

In a case where the unit thin-wire electrodes shown in, for example, FIG. 4 are included, the thin-wire electrodes 22 and 32 having a stepwise pattern are obliquely inclined in the different directions as a whole. Consequently, the thin-wire electrodes are not spaced at regular intervals and do not agree with the alignment direction of the pixels in the liquid crystal display with the touch screen fixed thereto. This can prevent the occurrence of moire.

The unit thin-wire electrodes include an intersection of the two thin wire electrodes that are inclined in the different directions and are formed to extend in the oblique directions. In addition, the thin-wire electrodes 22 and 32 have a meshed structure. Therefore, the partial disconnection of the detection electrodes 21 and 31 does not result in the entire disconnection. Thus, the highly-reliable touch screen can be provided.

<Configuration of Touch Panel, Display, Electronic Apparatus>

The following describes, as an example, configurations of a display, a touch panel 70, and an electronic apparatus that include the touch screen 1. The configurations of the display, the touch panel 70, and the electronic apparatus that are equipped with the touch screen 1 are not limited to the following description. The configurations may be set depending on the design including the mounting method and the configuration of the control board.

Figure 5:
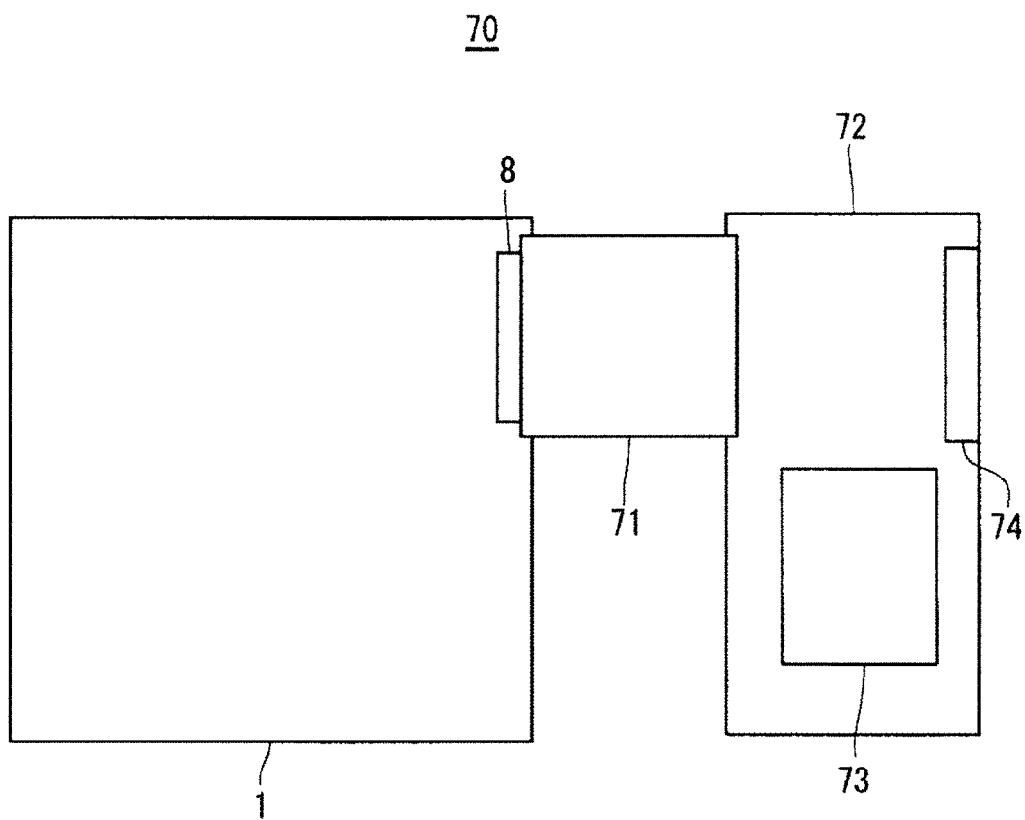
FIG. 5 is a plan view schematically showing a configuration of a touch panel.

The touch screen 1 described above is bonded to the surface of the display on the viewer side, to thereby provide the display equipped with the touch screen 1. As shown in FIG. 5, the touch panel 70 has the configuration described below. A flexible printed board 71 is mounted on the terminal 8 that provides the connection with the touch screen 1. The flexible printed board 71 is connected to a control board 72 with a detection processing circuit 73 mounted thereon, to thereby provide the touch panel 70. The touch screen 1 detects the changes in the capacitance between the first detection electrode 21 and the second detection electrode 31 caused by the touch with the pointer, and the detection processing circuit 73 calculates the coordinates in the touch screen 1 from the data of the detected changes.

The following describes the electronic apparatus including the touch panel 70. An external connection terminal 74 of the touch panel 70 outputs a digital signal of the touch coordinates given by the pointer on the touch screen 1. The output signal is input to an external signal processor (not shown), such as a computer. This configuration provides the electronic apparatus including the digitizer having the touched-position detection function.

FIG. 5 shows the configuration in which the detection processing circuit 73 is mounted on the control board 72. The detection processing circuit may include the output function, such as a USB, that satisfies the bus standard, providing the highly-versatile electronic apparatus having the touched-position detection function.

Although the touch screen 1 in this preferred embodiment has the laminated structure shown in FIG. 1, the configuration is not limited thereto. The touch screen 1 includes the lower electrode 20 and the upper electrode 30 laminated via the interlayer insulating film 11 disposed therebetween on the transparent substrate 10 and the polarizing plate is required to be disposed over the lamination on the viewer side. The transparent substrate 10 may be eliminated from the configuration by forming, for example, the lower electrode 20 directly on the front-surface side of the color filter substrate of the liquid crystal display.

As shown in FIG. 1, the touch screen 1 in this preferred embodiment includes the protective film 12 formed on the upper electrode 30, the polarizing plate 13 formed on the protective film 12, and the surface substrate 14 disposed on the polarizing plate 13. Alternatively, the polarizing plate 13 may be bonded to the protective film 12 and the surface substrate 14 may be omitted. This configuration allows the reduction in thickness and weight.

Second Preferred Embodiment

Figure 6:
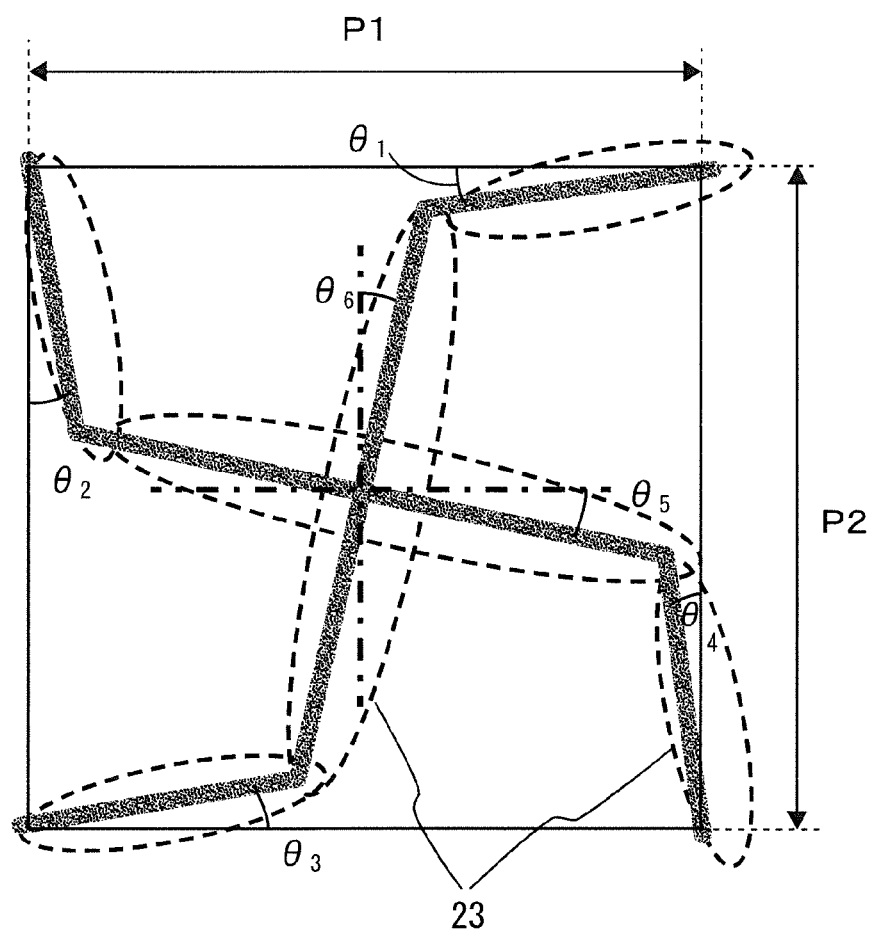
FIG. 6 is an enlarged view of the unit thin-wire electrodes of the touch screen according to a second preferred embodiment.

In the first preferred embodiment, the detection electrodes 21 and 31 have included, as the repetition unit, the unit thin-wire electrodes formed of the conductive thin wires 23 shown in FIG. 4. In this preferred embodiment, meanwhile, the detection electrodes 21 and 31 include, as the unit thin-wire electrodes, the conductive thin wire 23 shaped as shown in FIG. 6. The unit thin-wire electrodes included in the detection electrodes 21 and 31 differ from those of the first preferred embodiment. All of the configurations except for the above are the same as those of the first preferred embodiment.

FIG. 6 illustrates the unit thin-wire electrodes in this preferred embodiment. Each of the conductive thin wires 23 forming the unit thin-wire electrode is enclosed in the broken-line ellipse in FIG. 6. The both ends of each conductive thin wire 23 are combined with other conductive thin wires 23.

The alternate short and long dashed lines in the middle of FIG. 6 indicate the transmission axis direction and the absorption axis direction of the polarizing plate. Each of θ1 to θ6 indicates the angle formed by the conductive thin wire 23 and the transmission axis direction or the absorption axis direction. The θ1 to θ6 are required to fall within 10 degrees. Each of the θ1 to θ6 in this preferred embodiment is an angle of 5 degrees.

The P1 and P2 indicate the repetition pitch of the unit thin-wire electrodes in the respective directions. Each of the P1 and P2 in this preferred embodiment is equal to 200 μm.

The liquid crystal display combined with the touch panel including the detection electrodes 21 and 31 formed of the unit thin-wire electrodes shaped as described above has provided the excellent displaying free from a light leakage during the black display caused by the conductive thin-wires 23. Moreover, the touch screen has demonstrated excellent properties, preventing the occurrence of moire and the narrowing of the detection region during wire breakage owing to the redundant structure of the thin wire electrodes.

Third Preferred Embodiment

Figure 7:
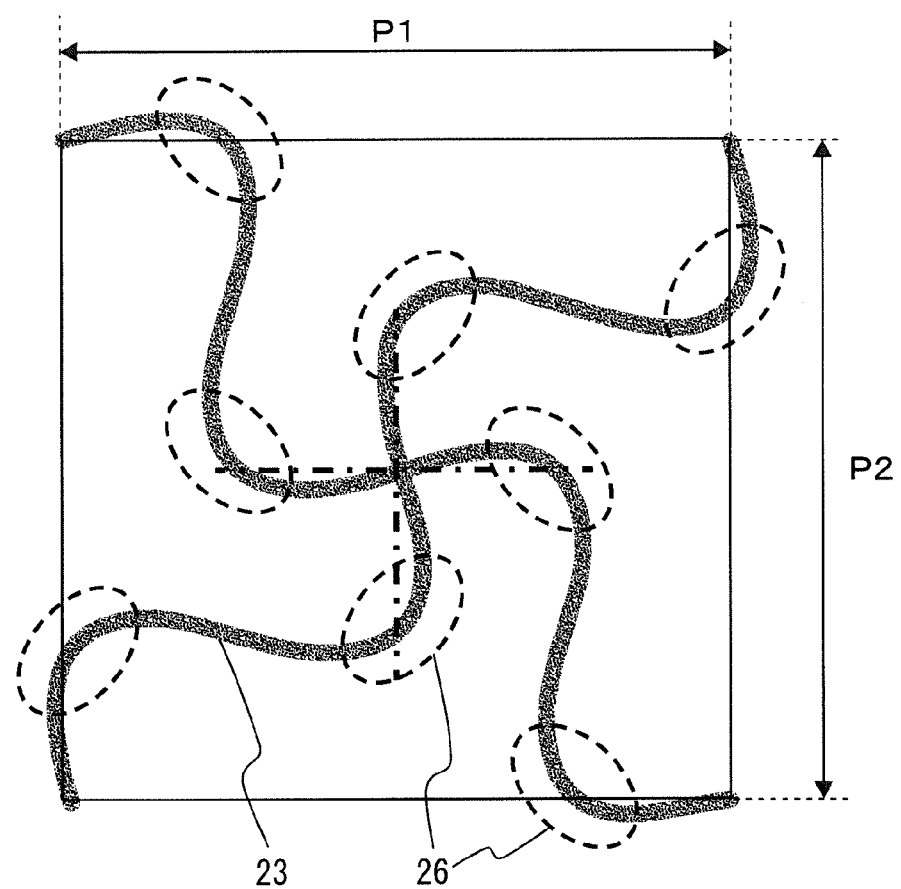
FIG. 7 is an enlarged view of the unit thin-wire electrodes of the touch screen according to a third preferred embodiment.

In the first preferred embodiment, the detection electrodes 21 and 31 have included, as the repetition unit, the unit thin-wire electrodes formed of the conductive thin wires 23 shown in FIG. 4. In this preferred embodiment, meanwhile, both of the detection electrodes 21 and 31 include, as the unit thin-wire electrodes, the conductive thin wires 23 shaped as shown in FIG. 7. The unit thin-wire electrodes included in the detection electrodes 21 and 31 differ from those of the first preferred embodiment. All of the configurations except for the above are the same as those of the first preferred embodiment.

FIG. 7 illustrates the unit thin-wire electrodes in this preferred embodiment. As compared to the shape of the unit thin-wire electrodes of the first preferred embodiment shown in FIG. 4, all of the conductive thin wires 23 are formed of curved lines and the both ends of the curved line are combined with flections 26 (each shown by the broken-line ellipse in FIG. 7) having the increased curvature. FIG. 7 differs from FIG. 4 in the first preferred embodiment in that the conductive thin wires 23 except for the flections 26 are formed of the curved line.

The P1 and P2 indicate the repetition pitch of the unit thin-wire electrodes in the respective directions. Each of the P1 and P2 in this preferred embodiment is equal to 200 μm.

The liquid crystal display combined with the touch panel including the detection electrodes 21 and 31 formed of the unit thin-wire electrodes shaped as described above has provided the excellent displaying free from a light leakage during the black display caused by the conductive thin-wires 23. The touch screen 1 observed in direct sunlight having illuminance of 80000 1x has provided the excellent displaying because the thin wire electrodes 22 and 32 having a curved shape has obscured the reflection and the glare on the end faces of the electrodes.

Fourth Preferred Embodiment

According to all of the preferred embodiments described above, the first detection electrodes 21 having a stripe pattern and the second detection electrodes 31 having a stripe pattern cross each other via the interlayer insulating film 11 as shown in FIG. 2. The first detection electrode 21 and the second detection electrode 31 include, as shown in FIG. 3, the first thin-wire electrodes 22 and the second thin-wire electrodes 32, respectively.

As shown in FIG. 3, the plurality of first detection electrodes 21 that are shaped in stripes formed of the first thin-wire electrodes 22 are aligned in parallel with a slight gap therebetween to form the lower electrode 20, and, via the interlayer insulating film 11, the plurality of second detection electrodes 31 that are shaped in stripes formed of the second thin-wire electrodes 32 are aligned in parallel with a slight gap therebetween to form the upper electrode 30.

When the pointer touches the touch screen 1 described above, the capacitance between the first detection electrode 21 and the second detection electrode 31 changes, allowing the identification of the touched position. The capacitance between the detection electrodes is required to be kept small while the touch screen 1 is not touched, such that the change in capacitance caused by the touch can be sensitively perceived.

As described above, in the touch screen 1 including the upper electrode 30 and the lower electrode 20 in which the detection electrodes 21 and 31 shaped in stripes are aligned in parallel with a slight gap therebetween, the capacitance is generated between the detection electrode 21 and 31 in close proximity while the touch screen 1 is not touched. In some cases, this capacitance interferes with the sensitive detection of the change in capacitance caused by the touch.

Thus, in this preferred embodiment, the region formed of the thin wire electrodes 22 and 32 that are not in electrical connection is provided between the detection electrodes 21 and 31 that are adjacent to each other, to thereby prevent the occurrence of unnecessary capacitance between the thin wire electrodes 22 and 32 that are adjacent to each other while the touch screen 1 is not touched. This preferred embodiment also provides a solution for the problem of visibility caused by such region formed of the thin wire electrodes 22 and 32 that are not in electrical connection.

In this preferred embodiment, the unit thin-wire electrodes formed of the conductive thin wires 23 are shaped in the pattern of the first preferred embodiment shown in FIG. 4. The pattern is not limited thereto, and alternatively, the unit thin-wire electrodes may have the pattern shown in FIG. 6 as in the second preferred embodiment or the pattern shown in FIG. 7 as in the third preferred embodiment.

Figure 8:
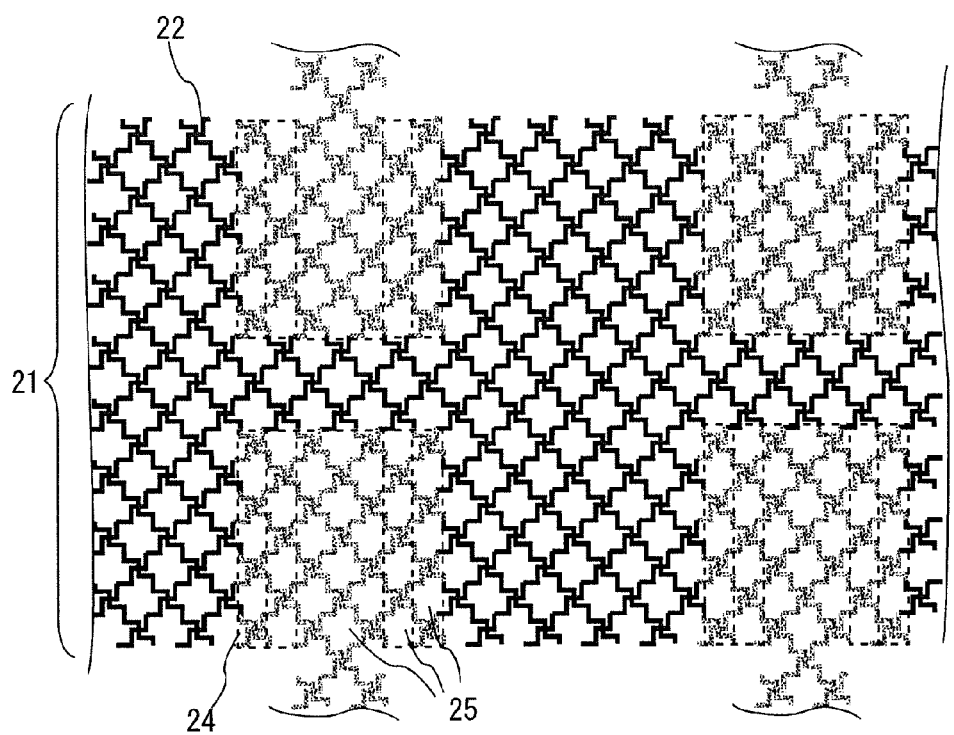
FIG. 8 is a plan view of a lower electrode of the touch screen according to a fourth preferred embodiment.

FIG. 8 illustrates the first detection electrode 21 in the vicinity of the intersection of the first detection electrode 21 and the second detection electrode 31 of the touch screen 1 according to this preferred embodiment. The first detection electrode 21 is continuous in the lateral direction of the paper and the broken lines indicate a wire breakage 24 in which the thin wire electrode 22 is disconnected. Thus, the thin wire electrode 22 included in the first detection electrode 21 is electrically disconnected by the wire breakage 24. The region within the wire breakage 24 serves as a floating electrode 25 that is not in electrical connection (in FIG. 8, the detection electrode 21 that is connected with, for example, the control circuit is shown in black and the floating electrode 25 is shown in gray).

Figure 9:
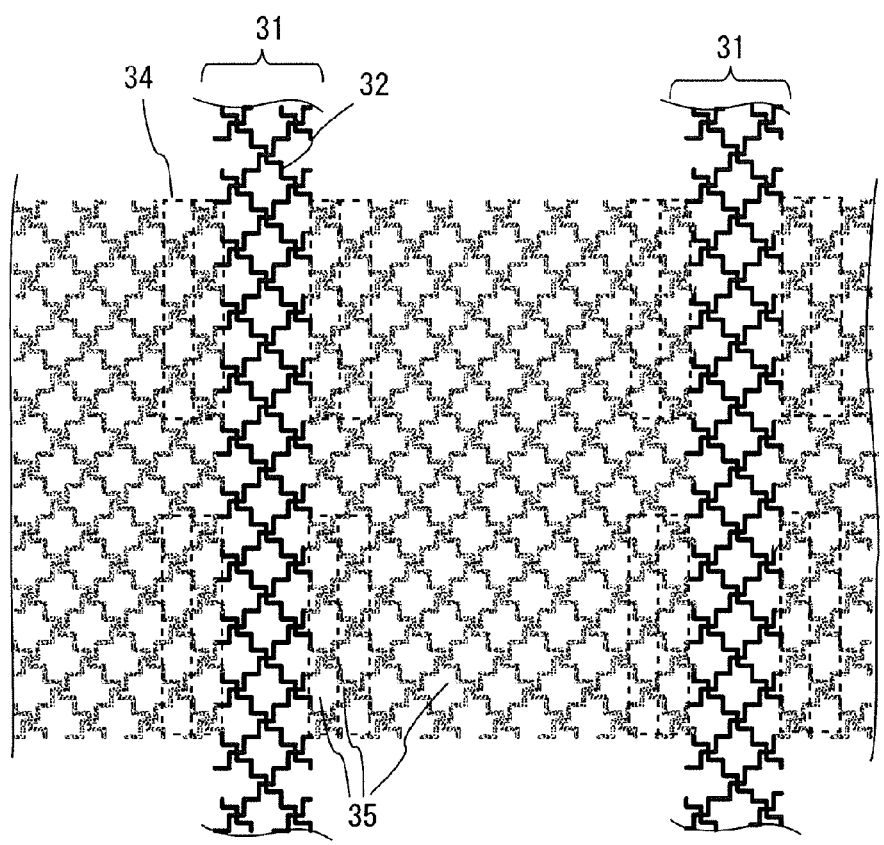
FIG. 9 is a plan view of an upper electrode of the touch screen according to the fourth preferred embodiment.

FIG. 9 illustrates the second detection electrode 31 (shown in black) in the vicinity of the intersection of the first detection electrode 21 and the second detection electrode 31 of the touch screen 1 according to this preferred embodiment. The second detection electrode 31 is continuous in the vertical direction of the paper. The thin wire electrode 32 is electrically disconnected by a wire breakage 34 shown by the broken lines as in FIG. 8 described above, forming a floating electrode 35 (shown in gray) that is electrically disconnected.

Figure 10:
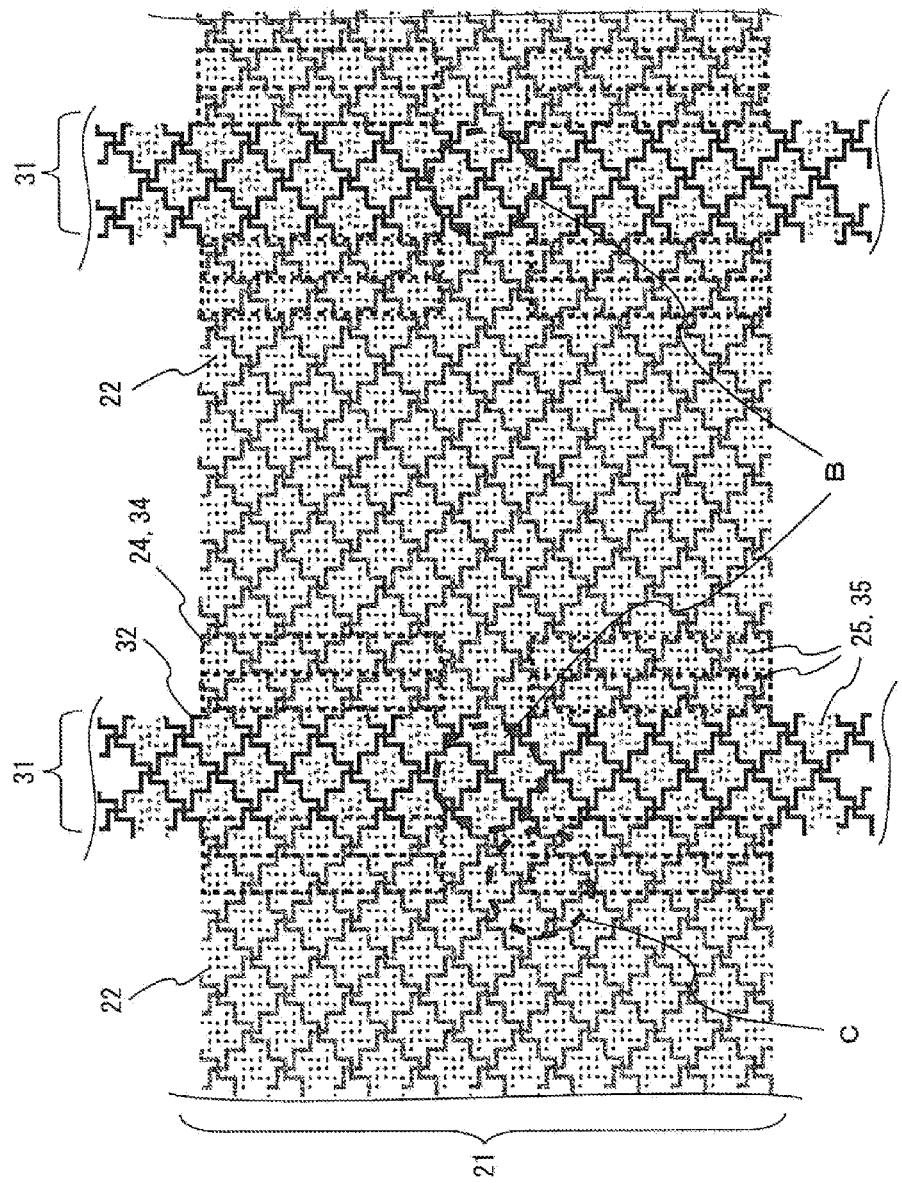
FIG. 10 is a plan view of the lower electrode and the upper electrode of the touch screen according to the fourth preferred embodiment.

FIG. 10 illustrates the state in which the first detection electrode 21 shown in FIG. 8 and the second detection electrode 31 shown in FIG. 9 overlap via the interlayer insulating film 11. In FIG. 10, the first detection electrode 21 and the floating electrode 25 thereof are indicated by the broken lines and the second detection electrode 31 and the floating electrode 35 thereof are indicated by the solid lines. The electrode portions connected with the detection circuit is shown in black and the floating electrodes 25 and 35 are shown in gray.

That is, the first detection electrode 21 in electrical connection is indicated by the black broken lines and the second detection electrode 31 in electrical connection is indicated by the black solid lines. The floating electrode 25 of the first detection electrode 21 is indicated by the gray broken lines and the floating electrode 35 of the second detection electrode 31 is indicated by the gray solid lines.

In FIG. 10, the first detection electrode 21 and the second detection electrode 31 that are indicated by the broken lines and the solid lines in black and are connected to the detection circuit cross each other at a part B enclosed in the broken-line circle. Other parts include at least one of the first detection electrode 21 and the second detection electrode 31 serving as the floating electrode 25 and the floating electrode 35. The parts enclosed by the broken-line rectangles extending along the detection electrode 31 include both of the first and second detection electrodes 21 and 31 serving as the floating electrodes 25 and 35.

The broken-line rectangles are positioned, as described above, in the wire breakages 24 and 34 in which the first and second detection electrodes 21 and 31 are electrically disconnected. That is, the conductive thin wires 23 included in the first and second detection electrodes 21 and 31 are interrupted by the wire breakages 24 and 34 with nothing formed therein.

As viewed from the front surface in this state, almost the entire surface of the touch screen includes the thin wire electrodes 22 and 32 evenly formed thereon, so that almost the entire surface is visually recognized to be uniform owing to, for example, reflections of the thin wire electrodes. Meanwhile, the conductive thin wires 23 are disconnected by the wire breakages 24 and 34, which are indicated by the broken-line rectangles described above, including neither the upper electrode 30 nor the lower electrode 20 formed therein. Consequently, the reflection state is clearly viewed unlikely to the other regions.

Thus, dummy wirings 36 are formed in the parts (the broken-line rectangles in FIG. 10) including neither the upper electrode 30 nor the lower electrode 20 formed therein. FIG. 11 shows an enlarged view of an alternate-short-and-long-dash-line circle C in FIG. 10. The dummy wiring 36 is formed in the same layer as the upper electrode 30 and is formed of the same material as that of the thin wire electrode 32. The direction of the dummy wiring 36 is the direction that is orthogonal to the conductive thin wires 23 of the second thin-wire electrode 32 included in the upper electrode 30, in other words, the direction identical to that of the conductive thin wires 23 of the first thin-wire electrode 22 included in the lower electrode 20.

As described above, the detection electrodes 21 and 31 are electrically disconnected to serve as the floating electrodes 25 and 35, thereby reducing the capacitance while the touch screen is not touched. This improves the sensitivity for the touch by the pointer. Moreover, the dummy wirings 36 are formed, to thereby prevent the reduction in visibility caused by the difference in the reflection state resulting from the disconnection of the detection electrodes 21 and 31. Therefore, the excellent displaying has been provided in the interior illuminance of 1000 lx.

While the invention has been shown and described in detail, the foregoing description is in all aspects illustrative and not restrictive. It is therefore understood that numerous modifications and variations can be devised without departing from the scope of the invention.

What is claimed is:

1. A touch screen comprising:
a transparent substrate;
a first detection electrode formed on said transparent substrate;
a second detection electrode disposed to cross said first detection electrode via an interlayer insulating film; and
a polarizing plate bonded to cover said second detection electrode,
wherein each of said first detection electrode and said second detection electrode includes, as a repetition unit, wire electrodes that incline in different directions and cross each other, said wire electrodes being formed of a combination of a plurality of conductive wires, with each wire extending in a direction inclined 10 degrees or less from a transmission axis direction or an absorption axis direction of said polarizing plate.

2. The touch screen according to claim 1, wherein said plurality of conductive wires are linear.

3. The touch screen according to claim 1, wherein said wire electrodes forming each of said first detection electrode and said second detection electrode have a meshed structure in which said conductive wires are combined with each other with ends thereof being interconnected.

4. The touch screen according to claim 1, wherein said wire electrodes having a mesh pattern and forming said first detection electrode and said wire electrodes having a mesh pattern and forming said second detection electrode complementarily deviate from each other in plan view.

5. A touch panel comprising:
the touch screen according to claim 1;
a switching circuit that successively selects each of a plurality of the first detection electrodes and a plurality of the second detection electrodes; and
a detection processing circuit that performs a calculation processing of touch coordinates on said touch screen on the basis of a capacitance formed between said first detection electrode selected by said switching circuit and a pointer touching a surface of said touch screen and between said second detection electrode selected by said switching circuit and said pointer.

6. A display comprising a display panel, including the touch panel according to claim 5 located on said display panel.

7. An electronic apparatus comprising:
the touch panel according to claim 5; and
an electron device that processes an output from said detection processing circuit of said touch panel as an input signal.

* * * * *